US008260854B2

(12) United States Patent
Cockerton

(10) Patent No.: US 8,260,854 B2
(45) Date of Patent: Sep. 4, 2012

(54) METHOD AND DEVICE FOR DYNAMIC STREAMING ARCHIVING CONFIGURATION

(75) Inventor: Craig Cockerton, Hamilton (NZ)

(73) Assignee: Cisco Technology, Inc., San Jose, CA (US)

( * ) Notice: Subject to any disclaimer, the term of this patent is extended or adjusted under 35 U.S.C. 154(b) by 348 days.

(21) Appl. No.: 11/854,301

(22) Filed: Sep. 12, 2007

(65) Prior Publication Data

US 2008/0072159 A1 Mar. 20, 2008

(30) Foreign Application Priority Data

Sep. 14, 2006 (NO) .................................. 20064164

(51) Int. Cl.
*G06F 15/16* (2006.01)
(52) U.S. Cl. ........ 709/204; 709/203; 709/205; 709/227; 709/228; 348/14.09
(58) Field of Classification Search .................. 709/204, 709/205, 227, 228; 707/101; 370/260; 348/14.08, 348/14.09
See application file for complete search history.

(56) References Cited

U.S. PATENT DOCUMENTS

| | | | |
|---|---|---|---|
| 6,564,261 B1 * | 5/2003 | Gudjonsson et al. ......... | 709/227 |
| 6,807,563 B1 * | 10/2004 | Christofferson et al. ..... | 709/204 |
| 7,113,992 B1 * | 9/2006 | Even ............................ | 709/227 |
| 7,293,240 B2 * | 11/2007 | Lapstun et al. ............... | 715/753 |
| 7,483,945 B2 * | 1/2009 | Blumofe ....................... | 709/204 |
| 2001/0043571 A1 | 11/2001 | Jang et al. | |
| 2003/0025787 A1 | 2/2003 | Stephens, Jr. | |
| 2003/0028535 A1 | 2/2003 | Sheldon et al. | |
| 2004/0119814 A1 * | 6/2004 | Clisham et al. ............ | 348/14.08 |
| 2004/0230655 A1 * | 11/2004 | Li et al. ......................... | 709/205 |
| 2010/0157851 A1 * | 6/2010 | Farah ............................ | 370/260 |

FOREIGN PATENT DOCUMENTS

| | | |
|---|---|---|
| CN | 1820474 A | 8/2006 |
| EP | 1 482 736 A2 | 12/2004 |
| JP | 11-184788 | 7/1999 |
| JP | 2004-187108 | 7/2004 |
| JP | 2005-518681 | 6/2005 |

(Continued)

OTHER PUBLICATIONS

"Packet-based multimedia communications systems", H.323, ITU-T (telecommunication standardization sector of ITU), Series H: Audio-visual and Multimedia systems, Jul. 2006, pp. 318.

(Continued)

*Primary Examiner* — Ramy M Osman
(74) *Attorney, Agent, or Firm* — Oblon, Spivak, McClelland, Maier & Neustadt, L.L.P.

(57) ABSTRACT

The present invention provides a system and a method allowing users to record/stream a video conference by dialing a Content Server from any endpoint using a personal alias or aliases, or by dialing an endpoint from a content server using a personal alias or aliases. The alias(es) will define their preferred streaming/archiving template(s) and call configuration(s), allow them to set specific viewing rules for the conference and identify them as the owner of the conferences created through this alias. The alias owner can also assign default meta data (title, description, etc.) and an access list for determining who can view the recorded and/or streamed conference. By allowing this, each user can easily stream/record a conference with their preferred settings without having to check or change the settings each time a new call is made, and without changing the settings for other users.

14 Claims, 4 Drawing Sheets

FOREIGN PATENT DOCUMENTS

| | | | |
|---|---|---|---|
| WO | WO 99/17235 A1 | | 4/1999 |
| WO | WO 9917235 A1 | * | 4/1999 |
| WO | WO 00/33537 | | 6/2000 |
| WO | WO 01/02940 A1 | | 1/2001 |
| WO | WO 01/35655 A2 | | 5/2001 |
| WO | WO 02/037803 A3 | | 5/2002 |
| WO | WO 0237803 A2 | * | 5/2002 |
| WO | WO 02/076048 A1 | | 9/2002 |
| WO | WO 03/090104 A1 | | 10/2003 |
| WO | WO 2004/044710 A2 | | 5/2004 |
| WO | WO 2004044710 A2 | * | 5/2004 |

OTHER PUBLICATIONS

Examination Report issued on Jan. 16, 2012 in European Patent Application No. 07 834 739.0-2223.

Chinese Office Action issued Dec. 12, 2011 in patent application No. 200780034393.6 (English translation only).

Japanese Office Action issued Oct. 18, 2011 in patent application No. 2009-528192 (English translation only).

* cited by examiner

```
<template version="1" readonly="true" description="Windows Media 9 2xStreams High with Dual">
        <writer writer_codec="WindowsMedia" profile_filename="WM9_512k(15fps).prx"
streaming_path="mms://(local)/" on_demand_path="mms://(local)/" on_demand_output="file" source="normal"
title="WindowsMedia Video 9 Writer 512k" pip_location="none">
                <output type="file" directory="(medialocation)/media/" title="File Output"/>
                <output type="serverpush" server_name="(local)" port="8080" publishing_point_copy=""
username="" password="" title="Serverpush Output"/>
        </writer>
        <writer writer_codec="WindowsMedia" profile_filename="WM9_256k.prx" streaming_path="mms://(local)/"
on_demand_path="mms://(local)/" on_demand_output="file" source="normal" title="WindowsMedia Video 9 Writer 256k"
pip_location="none">
                <output type="file" directory="(medialocation)/media/" title="File Output"/>
                <output type="serverpush" server_name="(local)" port="8080" publishing_point_copy=""
username="" password="" title="Serverpush Output"/>
        </writer>
        <writer writer_codec="WindowsMedia" profile_filename="WM9_VGA.prx" streaming_path="mms://(local)/"
on_demand_path="mms://(local)/" on_demand_output="file" source="extended" title="WindowsMedia Video 9 Writer
VGA" pip_location="none">
                <output type="file" directory="(medialocation)/media/" title="File Output"/>
                <output type="serverpush" server_name="(local)" port="8080" publishing_point_copy=""
username="" password="" title="Serverpush Output"/>
        </writer>
        <writer writer_codec="StillImage" source="extended" title="StillImage Writer">
                <output type="file" seconds_between_frames="15" title="File Output"/>
        </writer>
</template>
```

FIGURE 3

```
<callconfig version="1" readonly="true" description="Full Call Configuration">
        <extended_video enabled="true" vga="true" svga="true" xga="true"/>
        <capabilities max_time_in_call="0">
                <bandwidth b64="true" b128="true" b192="true" b256="true" b384="true" b512="true" b768="true"
b1024="true" b1280="true" b1536="true" b1920="true" b2048="true"/>
                <codecs advertise_video="true" codec_H263="true" codec_H261="true" advertise_audio="true"
codec_G711="true" codec_G722_1="true" codec_G722="true"/>
        </capabilities>
</callconfig>
```

FIGURE 4

METHOD AND DEVICE FOR DYNAMIC STREAMING ARCHIVING CONFIGURATION

FIELD OF THE INVENTION

The present invention relates to videoconferencing and streaming/archiving systems.

BACKGROUND OF THE INVENTION

To have a meeting among participants not located in the same area, a number of technological systems are available. These systems may include videoconferencing, web conferencing or audio conferencing.

The most realistic substitute of real meetings is high-end videoconferencing systems. Conventional videoconferencing systems comprise a number of end-points communicating real-time video, audio and/or data streams over WAN, LAN and/or circuit switched networks. The end-points include one or more monitor(s), camera(s), microphone(s) and/or data capture device(s) and a codec, which encodes and decodes outgoing and incoming streams, respectively. In addition, a centralized source, known as a Multipoint Control Unit (MCU), is needed to link the multiple end-points together. The MCU performs this linking by receiving the multimedia signals (audio, video and/or data) from end-point terminals over point-to-point connections, processing the received signals, and retransmitting the processed signals to selected end-point terminals in the conference.

By using a videoconferencing system, e.g. a PowerPoint presentation or any other PC-presentation may be presented while still being able to see and hear all the other participants.

Another common way of presenting multimedia content is to stream data to computers through a web interface. The data stream may be transmitted in real-time, or a play back of an archived content through a content server. Conventional streaming data is adapted for storage and distribution, and therefore the multimedia content is represented in a different format than for video conferencing. Hence, to allow for streaming and archiving of a conventional video conference, a system for converting the multimedia data is needed. One example of such system is described in the following.

A content server (CS) is preferably provided with a network interface for connecting the server to a computer network, audio/video and presentation data interfaces for receiving conference content, a file conversion engine for converting presentation content into a standard image format for distribution, and a stream encoder for encoding the content into streaming format for distribution. The CS is further equipped with a stream server for transmitting the encoded audio/video content and a web server for transmitting web pages and converted presentation content to terminals located at nodes of the network. The CS is also adapted to create an archive file consisting of the encoded stream data, residing at local storage media or in a server/database, to enable later on-demand distribution to requesters at remote terminals over the computer network.

According to a typical mode of operation, the conference is initiated by including the CS as a participant in the conference. The CS accepts or places H.323 video calls as point-to-point (only one H.323 system in the call, typically used to record training materials from a single instructor) or multipoint (2-n H.323 systems in the call, typically used to stream or archive meetings). A viewer at a remote terminal can access a conference by directing a conventional web browser to an URL (Uniform Resource Locator) associated with the distribution device. After completion of validation data interchanges between the viewer and the distribution device, the viewer is able to view the personal interchange, i.e. the conversation and associated behaviour, occurring between the participants at the conference presenter site, as well as view the presentation content being presented at the conference site. The multimedia content is viewed in a multiple-window user interface through the viewer web browser, with the audio/video content presented by a streaming media player, and the presentation content displayed in a separate window. When requested by the head of the conference or by the conference management system, encoded stream data is stored in a server as an identifiable file.

The Content Server is based on a Line (or Port) structure, meaning that each CS has one or more lines each with the functionality of either being a transcoding line or and archiving line. Each of these lines is assigned a specific recording/streaming template as defined by the system administrator. The content of a template determine how output from a videoconference is handled by the CS to produce the desired output. The template defines different settings for the call, e.g.

What codecs or combination of codecs are needed. Windows Media, Real Media, quicktime, etc.
Bandwidth/streaming rates; 56K, 256K, 384, etc.
Video, audio or both
Still images or not
Dual stream Video and slides
Picture in Picture presentation layout
Encryption on/of
Password On/off
etc.

Every call made to or from a line is recorded/streamed using this template. Any change of the template used on the line is a system wide change and all conferences from the time of the change will use the new template.

However, this method of attaching a template to a line in a one-to-one relationship is very limiting since all users must use the current selected template or change the template before making a call. Therefore, a more dynamic selection of recording/streaming templates is needed.

One prior art recording and streaming system allows a user to own a "line", meaning that an alias refers to a specific line on the recording system, and for incoming calls they get the functionality of that line. Whereas for outgoing calls that same user can use a "call template" (or address book entry) where they can further define information such as the call description, basic call options and some security options. However, these functionalities have to be set for every end-point added as an address book entry and are somewhat limited. This model has very little flexibility and requires much duplication of effort in cases where you want multiple users to follow the same configuration.

Another prior art recording and streaming system stores parameters for recordings based on an endpoint identifier. This identifier is either the ip address or the endpoints alias. However, the parameters that can be set are limited to; display name, preferred video size, preferred bandwidth to and from, and H.239 video contribution. Further settings for recordings are made on a site wide basis which is very inflexible. If your recoding parameters is associated with your desktop endpoint, you will not be able to record a call with your preferred parameters when you make a call from a meeting room endpoint.

SUMMARY OF THE INVENTION

It is an object of the present invention to provide a method and a system solving at least one of the above-mention problems in prior art.

The features defined in the independent claims enclosed characterise this method and system.

BRIEF DESCRIPTION OF THE DRAWINGS

In order to make the invention more readily understandable, the discussion that follows will refer to the accompanying drawings.

FIG. 3 shows an example template file, FIG. 4 shows an example call configuration file.

DETAILED DESCRIPTION THE INVENTION

In the following, the present invention will be discussed by describing a preferred embodiment, and by referring to the accompanying drawings. However, people skilled in the art will realize other applications and modifications within the scope of the invention as defined in the enclosed independent claims.

A content server (CS), as presented above, may be accessible through a service provider or be part of a enterprise communication network. Either way, multiple users with different setup requirements are most likely to use the same device. Therefore, a template system where each user is associated with a self defined template would therefore be the most adequate solution.

The basic idea of the present invention is to provide a system and a method allowing users to record/stream a video conference by dialing a Content Server from any endpoint using a personal alias or aliases, or by dialing an endpoint from a content server using a personal alias or aliases. The alias(es) will define their preferred streaming/archiving template(s) and call configuration(s), allow them to set specific viewing rules for the conference and identify them as the owner of the conferences created through this alias. The alias owner can also assign default meta data (title, description, etc.) and an access list for determining who can view the recorded and/or streamed conference. By allowing this, each user can easily stream/record a conference with their preferred settings without having to check or change the settings each time a new call is made, and without changing the settings for other users.

Figure 1:
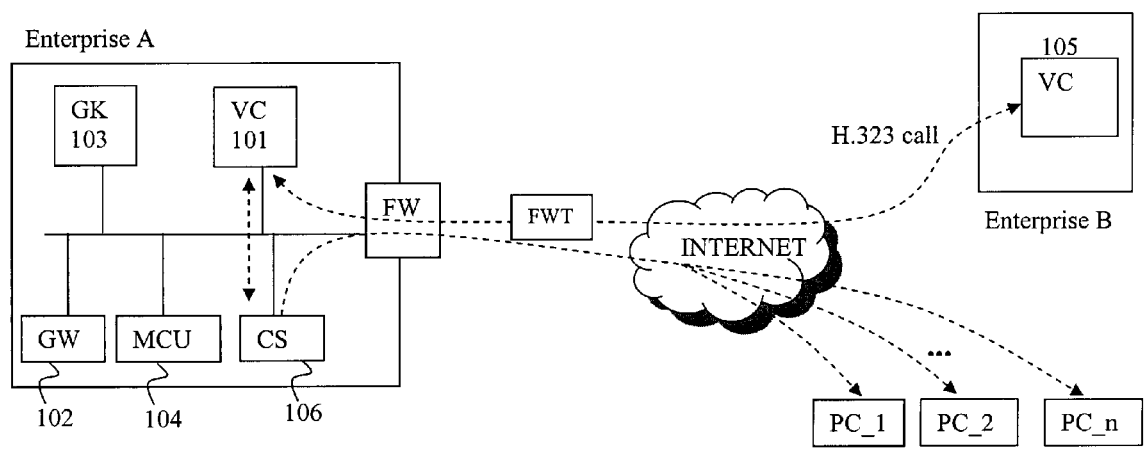
FIG. 1 is a block diagram illustrating a typical system architecture of audio and/or video conferencing equipment in a packet switched network.

FIG. 1 show video conferencing equipment connected to a typical packet based network. H.323 is an International Telecommunications Union (ITU) standard that provides specification for computers, equipment, and services for multimedia communication over packet based networks that defines how real-time audio, video and data information is transmitted. The H.323 standard specifies four kinds of components, which, when networked together, provide the point-to-point and point-to-multipoint multimedia-communication services:

1. terminals (101)
2. gateways (102)
3. gatekeepers (103)
4. multipoint control units (MCUs) (104)

H.323 Terminals are the endpoints on the LAN that provide real-time two way communications. Terminals are usually a personal computer (PC) or a stand alone-device (e.g. video conferencing endpoint). Gatekeepers are responsible for providing address translation between an endpoints current IP address and its various H.323 ID aliases, call control and routing services to H.323 endpoints, system management and security policies. An H.323 gateway provides connectivity between an H.323 network and a non-H.323 network (e.g. ISDN). Finally, the MCUs provide support for conferences of three or more H.323 terminals.

As mentioned above, in order to produce streaming and recording outputs from a video conference, the content server (106) acts like a video conferencing endpoint (terminal). The CS (106) can join a point-to-point or a multipoint video conference just like any other endpoint, but instead of displaying the output on a screen like most regular video conferencing endpoints, it processes the data into other useful outputs.

As an endpoint the CS may also have one or more alias addresses associated with it. The alias addresses provide an alternate method of addressing the endpoint. These addresses include E.164 (network access number, telephone number, etc.), H.323 IDs (alphanumeric strings representing names, e-mail-like addresses, etc.), and any others defined in Recommendation H.225.0. Alias addresses are unique within a Zone, Domain, among Zones, and among Domains.

As discussed above, a gatekeeper (103) is a network device that provides addressing service for H.323 videoconference devices. Use of a gatekeeper (103) allows a videoconference device to "dial" another device using the videoconference alias rather than an IP address (which could be changed by DHCP). In order for a gatekeeper (103) to know where to direct a call, terminals (101) and gateways (102) must register with the gatekeeper (103), informing the gatekeeper (103) of their present IP addresses and their associated aliases. The called endpoint's E.164 address may consist of an optional service prefix followed by the E.164 alias. The service prefix consists of n digits from the set of 0 to 9, * and #, where n is a predetermined number of digits. One purpose of such a service prefix might be to request access to a Gateway. The Gatekeeper may alter this address prior to sending it to the destination.

According to the present invention, the CS (106) registers with its local gatekeeper (103) as a gateway with one or more service prefixes and/or suffixes. By doing this, all calls directed to an address starting with one of the registered service prefixes, or ending with one of the registered service suffixes, are forwarded to said content server by the gatekeeper, regardless of the remaining digits (or alphanumeric characters) in the address. The remaining digits (or alphanumeric characters) are referred to as an internal alias, and together with the service prefix or suffix they constitute a personal alias.

Personal aliases are created in the distribution device for each user through a web based user interface. The personal aliases are stored in the content server as separate records in a database. As mentioned above, a personal alias consists of two parts:

1. Prefix—the service prefix registered with a local gatekeeper, identifying the distribution device as an H.323 gateway.
2. Internal Alias—an alias created in the distribution device matching to the specific personal alias.

An example personal alias based on the use of E.164 aliases would be:

570011 where 57 is the service prefix and 0011 is the internal alias. Further, a personal alias is capable of being registered as both an E.164 and an H.323 ID alias. When using H.323 ID aliases the gatekeeper can support both prefixes and suffixes in the address. This means that when a call is made to a H.323 ID alias, the gatekeeper matches the called address to an internal database of registered prefixes and suffixes. If a string at the beginning or end of the address matches one of the registered prefixes or suffixes respectively, the call is forwarded to the gateway associated with this prefix or suffix, regardless of the remaining alphanumerical characters in the address. An example personal alias based on the use of H.323 ID aliases and prefixes would be:

stream.john.henderson where stream is the prefix and john.henderson is the internal alias. An example personal alias based on the use of H.323 ID aliases and suffixes would be:

stream.john.henderson@acme.com where @acme.com is the suffix and stream.john.henderson is the internal alias.

Figure 2:
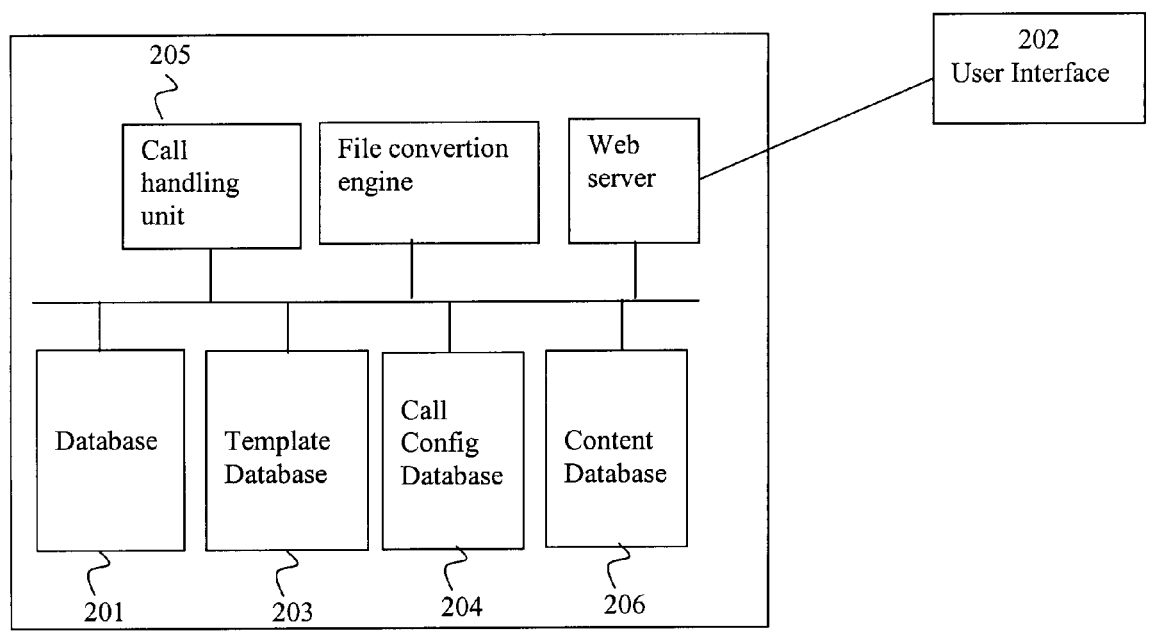
FIG. 2 is a block diagram illustrating a typical system architecture of an streaming and archiving system of the present invention.

FIG. 2 is a block diagram showing the various components of an embodiment of the content server. The CS consist of a database (201) were all aliases are stored. Creation of aliases is typically done by an administrative user for security reasons. Once the alias is created, and all the administrator settings are set, the user may log into the CS through a web based User Interface (202) and set preferred recording/streaming settings for the conference. These settings will be stored in the CS's database (201) along with the internal alias. The stored information for each database record is as follows:

| Alias type | Settings | |
|---|---|---|
| Personal | Internal E.164 alias (e.g. 0011) | Admin Edit |
| | Internal H.323 ID alias (e.g. stream.john.henderson) | Admin Edit |
| | Template (e.g. wmDefault-Dual-VGA.xml) | User Edit |
| | Call configuration (e.g. easyInterop.xml) | User Edit |
| | Username (e.g. john.henderson) | Admin Edit |
| | Default Access List (e.g. owner = Acme_US, user = Acme R&D) | User Edit |
| | Default Category | User Edit |
| | Default meta data (e.g. Title, Description, Presenter, etc.) | User Edit |

Access to the alias (both E.164 and H.323 alias) is preferably restricted to the administrator, but access may of course be granted to the users if necessary. However, the prefix and/or suffix portion of the personal alias is not user modifiable so it is important to present the full alias to the user rather than the internal alias to prevent confusion on what alias to dial. The full alias however is not necessary to store in the content server database.

The "Template" file stores information about the recording and streaming formats and outputs. It is in this file that the alias defines which streaming formats to use, what type of outputs to use within this streaming format and define information such as where the source media information is to be obtained from (e.g. normal video source, H.239/DuoVideo source etc). An example template file is shown in FIG. 3. The user will not need to create the file itself. All possible output configurations are stored as multiple template files in a template database (203), and in the user interface (202) the user will be presented with a list of available template files through a drop-down menu, or similar.

The "Call Configuration" file contains the H.323 settings for the call. This includes what codec's to advertise (use), what bandwidths are available for outgoing calls and what the maximum bandwidth is for all calls, and call duration settings. Alternatively this file contains Session Initiation Protocall (SIP) settings for the call, if SIP is preferred. An example template file is shown in FIG. 4. Call configuration files is stored in a internal database (204), and can be selected in a similar fashion as the template files.

The "Username" defines an owner for the personal recording alias.

"Default Access List" defines the default access list for a conference recorded or streamed based on the alias. This list defines who can view the conference and who can edit the conference details.

The "Default Category" is simply a way to assign the conference recording to a specific category if required.

"Default Meta data" allows the user to define information such as Title, Description, Presenter, Copyright, keywords etc for the conferences created with this alias.

When a user wishes to record or stream a video conference session using his/her preferred settings, he/her may dial the alias assigned to him/her by a administrator, from a terminal/endpoint. The user may choose which alias to use (E.164 or H.323 ID), if both are created in the profile. Upon receiving the call, the gatekeeper searched the dialed address for a prefix or suffix match. A prefix or suffix match is found if a part of the dialed address is identical to a registered prefix or suffix. To identify a match, the gatekeeper searched its internal storage for a prefix or suffix match. If such a match is found, the call is forwarded to the device registered with the matched prefix or suffix. E.g. a company named Acme registers its content server with a gatekeeper with the suffix @stream.acme.com. When a user dials the address john.henderson.stream@acme.com, the gatekeeper matches the prefix @acme.com to one its stored suffixes, and then forward the call to the content server at Acme.

Figure 5:
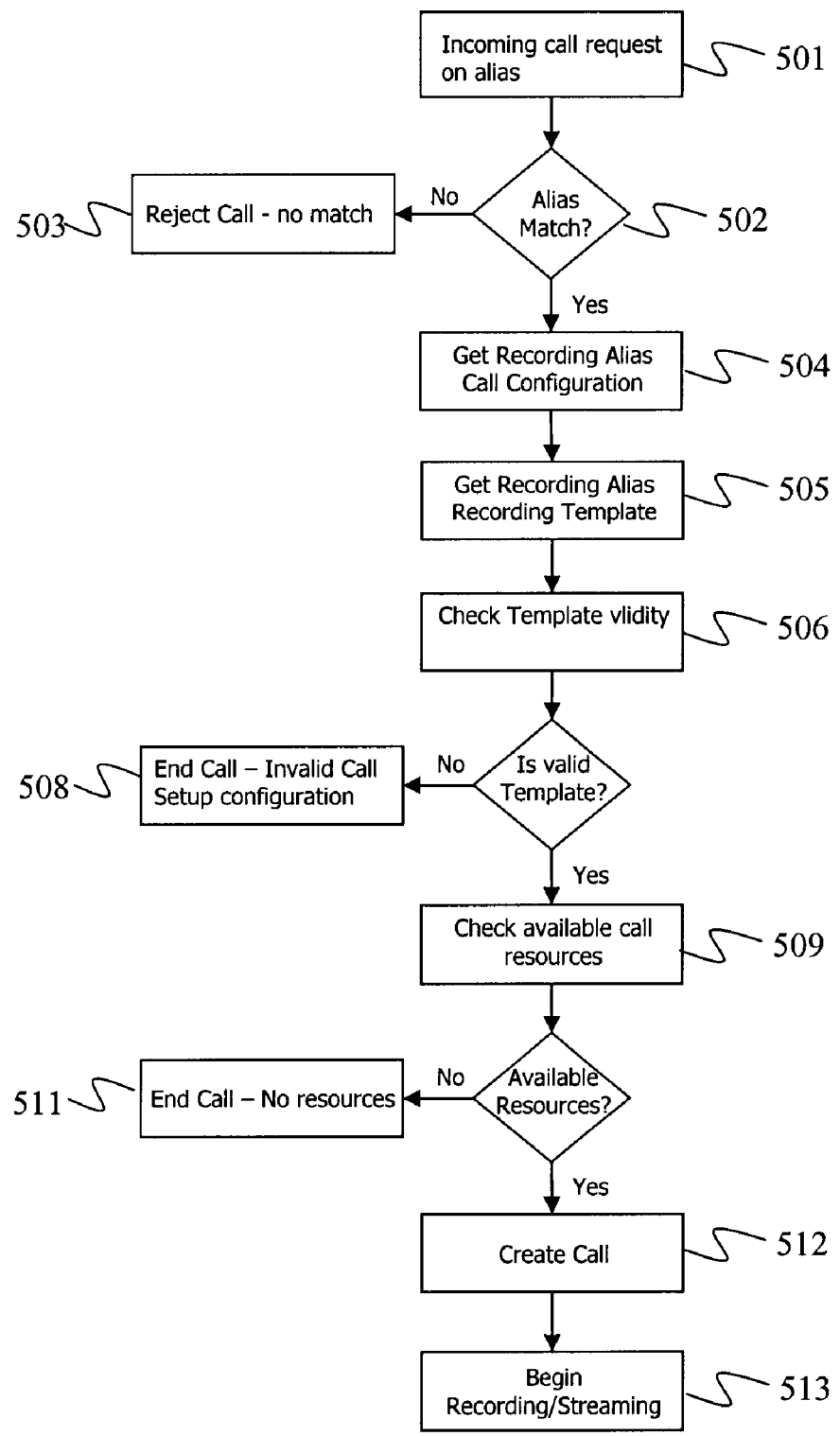
FIG. 5 is a flow diagram illustrating the steps performed in an exemplary embodiment of calling the content server using an personal alias.

FIG. 5 is a flow diagram illustration the steps involved in an exemplary embodiment of calling the content server using a personal alias. Upon receiving the call request (501), a call handling unit (205) in the content server analyses the receiver identification (called address), and extracts the internal alias. The internal alias can e.g. be extracted by simply removing the prefix or suffix from the receiver identification. In our example above, this would leave us with the internal alias; john.henderson.stream. When the call handling unit (205) has extracted the internal alias, it searches the CS's internal database (201) records for an internal alias match (502). An internal alias match is found if the extracted internal alias is identical to an alias stored in one of the records in the database (201). If such a match is not found, the call is rejected (503). If such a match is found, the call handling unit loads the stored information for that alias into the call handling unit. The stored information is the streaming and/or archiving settings for that alias, and defines witch template file, call configuration file, meta data, access list, etc. to use for the streaming and/or archiving task. In order to set up a call, the profile must at least define a template file and a call configuration file to use. So, the call handling unit at least gets the call configuration file (504) and template file (505) from their respective databases (204, 206), and analyses (506) them to ensure that they are valid. A template is not valid if any required information is not included within the xml file. If the template is invalid, the call is not accepted (508). If the template is valid, the call handling unit checks (509) if enough recourses is free to handle the call. If the CS does not have enough recourses to create the call, the call will be terminated (511). If enough resources are available, the call is created (512) and the recording/streaming of the conference commences (513)

using the settings associated with the extracted internal alias. In our example, a match of the extracted internal alias (john.henderson.stream) is found in the database, and the call handling unit gets the associated template file (wmDefault-Dual-VGA.xml), the associate call configuration file (easy-Interop.xml) and the associated access list (owner=Acme_US, user=Acme R&D), and the call request is accepted. Further, if a password is required for watching the stream, this information would be extracted from the database listing. The meta data and user name may also be used to display information to the receiving party.

The user may also stream and/or record a conference using his/her personal alias by initiating a call from the content server. This can be done in the web base user interface. The user may send a call request to any videoconferencing device by entering the address of the videoconferencing device in an address field in the user interface. In order for the content server to know which settings to use for the recording and/or streaming task, the user is required to select an internal alias from a list or enter the alias in a assigned field. If the user fails to enter a personal alias, the call handling unit uses a default alias for the call. The call handling unit then performs step 502-512 as shown in FIG. 5. Alternatively, the user interface may automatically checks if the CS has free resources when the user logs into the user interface (UI), in order to tell the user right away if a call is possible.

Further, one or more public aliases may be created. Public aliases are basically the same as personal aliases; apart from that they are not user modifiable. An administrative user may create and edit a set of public aliases, where each public alias defines the most frequently used templates and call configurations when recording/streaming conference calls. Public aliases provide users quick and easy access to standard configurations without needing to change their own personal alias before a call.

According to the invention, the distribution device may also be registered at the gatekeeper as a terminal. Instead of registering a service prefix as in the gateway model described above, the distribution device will register all the personal aliases with the gatekeeper. This method of registration will limit the number of aliases a distribution device will support, based on the maximum registrations from a single endpoint that the gatekeeper supports. This will vary between gatekeeper manufacturers. While limited in the total number of supported aliases, this method provides advanced dialing profile features for distribution devices without gateway functionality.

Under the gateway registration method it is possible for the recording system to maintain Personal Recording Aliases in the magnitude of thousands. The distribution device shall be able to register a service prefix with the gatekeeper as well as registering standard aliases as if it were a terminal. However, gateway registration of the distribution device only requires registering one or more recording prefixes, and maintaining the remainder of the alias within its own system.

One of the advantages of the present invention is that the entire call configuration, recording and streaming configuration, conference information and conference access can be configured through the use of a single alias. Further, thousands of users can use one (or a few) recording alias, or thousands of users can each have their own personal recording alias, allowing great flexibility to users. Recording Aliases can be used for individuals, groups, teams, departments—basically any individual or group can be represented by an alias. A user can easily change the configuration of how their conference is recorded by simply dialing a difference alias. Contrary to prior art, the present invention is independent of "lines", since the alias defines all the configuration that would normally be attached to a "line", and is no longer limited by the X lines=X recording configurations.

The invention claimed is:

1. A method for configuring a content server comprising:
   storing, with said content server, a plurality of video conference templates in a database in said content server, each video conference template containing user aliases or parts of user aliases associated with a user, and personal settings for streaming or recording a video conference call with said content server that are associated with said user aliases or said parts of said user aliases, the video conference template being available to automatically configure streaming or recording of plural different video conference calls in which the user associated with each video conference template participates, each video conference template being associated with the user, without being associated with a physical location of the user;
   establishing, with said content server, the video conference call between the content server and a conference device, wherein said establishing includes,
      sending a video conference call request from said content server using a user alias as sender identification, or
      receiving a video conference call request at said content server from a conference device using a user alias as receiver identification;
   extracting, with said content server, at least a part of said sender or receiver identification, and comparing said extracted sender or receiver identification with the user aliases or said parts of said user aliases stored in said database; and
   streaming or recording, with said content server, said video conference call by automatically using said personal settings for the video conference template for a user alias in said database that matches said extracted sender or receiver identification.

2. The method according to claim 1, wherein the establishing further includes,
   registering said content server with a gatekeeper,
   receiving a video conference call request at the gatekeeper from said conference device using said user alias as receiver identification, and
   routing the video conference call request to said content server.

3. The method according to claim 2, wherein the registering further includes registering said content server with the gatekeeper as a gateway with one or more service prefixes or suffixes, and the extracting further includes removing the one or more service prefixes or suffixes from the receiver identification.

4. The method according to claim 2, wherein the registering further includes,
   registering said content server with said gatekeeper as a terminal, and
   registering each of said user aliases or said parts of said user aliases in said database with said gatekeeper.

5. The method according to claim 1, wherein the establishing further includes,
   selecting one of said user aliases or said parts of said user aliases in said database as sender identification, and
   sending a video conference call request from said content server to said conference device.

6. The method according to one of the preceding claims, wherein said personal settings for said content server comprise, a Call Configuration file containing H.323 or SIP settings for the video conference call.

7. The method according to claim 1, wherein said personal settings for streaming or recording a video conference call with said content server further include personal settings for,
- a user alias owner,
- an access list defining who can view the video conference call and who can edit the video conference call details,
- a default Category assigning the video conference call recording to a specific category, and
- meta data containing one or more of Title, Description, Presenter, Copyright, or keywords for the video conference call.

8. A system for configuring a content server comprising:
- a converting engine configured to receive a H.323 or SIP coded data stream and convert an initial conference format coded data stream to a multimedia streaming format;
- a database configured to store a plurality of video conference templates, each video conference template containing user aliases or parts of user aliases associated with a user, and their associated personal settings for streaming or recording a video conference call with said content server, the video conference template being available to automatically configure streaming or recording of plural different video conference calls in which the user associated with each video conference template participates, each video conference template being associated with the user, without being associated with a physical location of the user; and
- a call handling unit configured to establish the video conference call between the content server and a conference device, where the call handling unit is configured to,
  - send a video conference call request using a user alias as sender identification, or
  - receive a video conference call request from a conference device where a user alias is used as receiver identification,
- wherein the call handling unit is further configured to extract at least a part of said sender or receiver identification, and compare said extracted sender or receiver identification with the user aliases or said parts of said user aliases stored in said database, and
- the converting engine is further configured to stream or record said video conference call by automatically using the personal settings for the video conference template for a user alias in said database that matches said extracted sender or receiver identification.

9. The system according to claim 8, wherein the call handling unit is further configured to,
- register said content server with a gatekeeper, in such a way that when the gatekeeper receives a video conference call request from said conference device using said user alias as receiver identification, the video conference call request is routed to said content server.

10. The system according to claim 9, wherein the call handling unit is further configured to,
- register said content server with a gatekeeper as a gateway with one or more service prefixes or suffixes, and
- extract the user alias when a video conference call request is received by removing said one or more service prefixes or suffixes from the receiver identification.

11. The system according to claim 9, wherein the call handling unit is further configured to,
- register said content server with said gatekeeper as a terminal, and
- register each of said user aliases or said parts of said user aliases stored in the database with said gatekeeper.

12. The system according to claim 8, wherein said call handling unit is further configured to select any of said user aliases or said parts of said user aliases in said database as sender identification.

13. The system according to one of the claims 8-11, wherein said personal settings for said content server at least include,
- a call configuration file containing the H.323 or SIP settings for the video conference call.

14. The system according to claim 8, wherein said personal settings for streaming or recording a video conference call with said content server further include personal settings for,
- a user alias owner,
- an access list defining who can view the video conference call and who can edit the video conference call details,
- a default Category assigning the video conference call recording to a specific category, and
- meta data containing one or more of Title, Description, Presenter, Copyright, or keywords for the video conference call.

* * * * *